(No Model.) 2 Sheets—Sheet 1.
N. L. DARLING.
STEAM GANG PLOW.

No. 454,206. Patented June 16, 1891.

(No Model.) 2 Sheets—Sheet 2.

N. L. DARLING.
STEAM GANG PLOW.

No. 454,206. Patented June 16, 1891.

Witnesses,
J. S. Nurse
J. A. Bayless

Inventor,
Naaman L. Darling
By Dewey & Co.
Attys

UNITED STATES PATENT OFFICE.

NAAMAN L. DARLING, OF BENICIA, CALIFORNIA, ASSIGNOR TO THE BENICIA AGRICULTURAL WORKS, OF SAME PLACE.

STEAM GANG-PLOW.

SPECIFICATION forming part of Letters Patent No. 454,206, dated June 16, 1891.

Application filed February 3, 1891. Serial No. 380,110. (No model.)

*To all whom it may concern:*

Be it known that I, NAAMAN L. DARLING, a citizen of the United States, residing at Benicia, Solano county, State of California, have invented an Improvement in Steam Gang-Plows; and I hereby declare the following to be a full, clear, and exact description of the same.

My invention relates to a device which I call a "steam gang-plow;" and it consists, essentially, of a main frame with means for connecting it with a traction-engine, and means for connecting with said frame as many gangs of plows as it may be desired to haul, and in certain details of construction, all of which will be more fully explained by reference to the accompanying drawings, in which—

Figure 1:
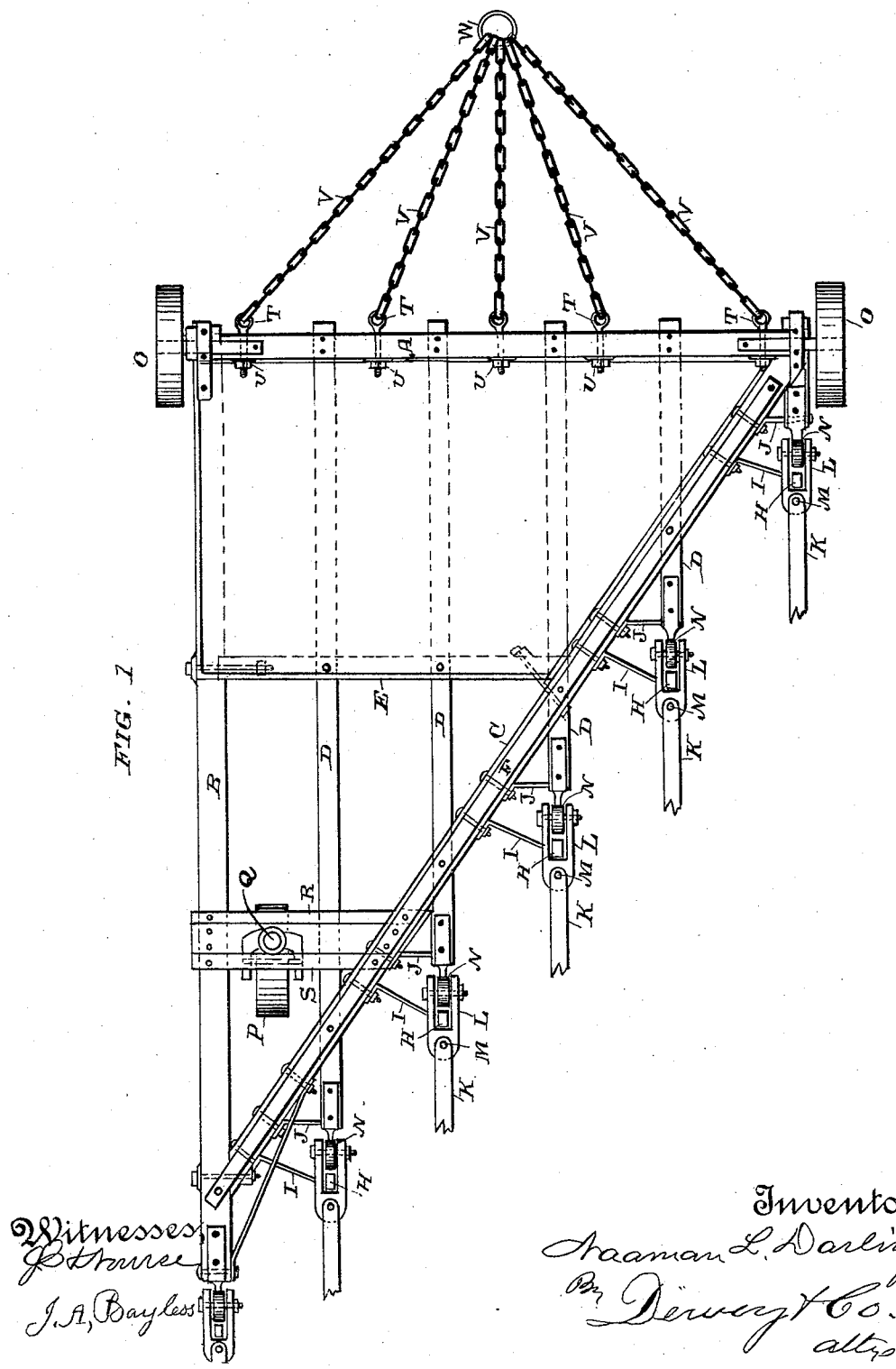
Figure 2:
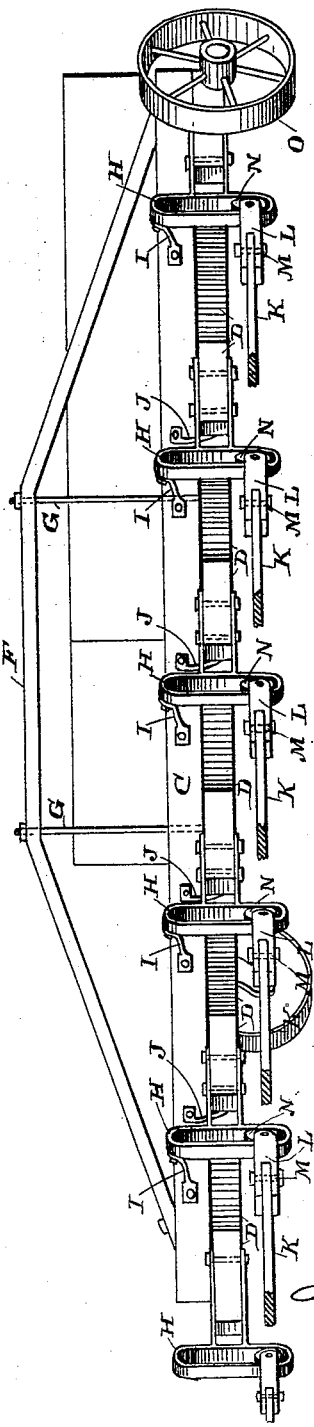

Figure 1 is a plan view of my apparatus. Fig. 2 is a side elevation showing the diagonal timber and truss and the adjustable connections for the plows.

My main frame-work or bed is made triangular in shape, consisting of a front timber A, a timber B, extending rearwardly at right angles therewith, and the timber C, forming the hypotenuse of the triangle. This frame is made so large that it may have connected with it as many as six gangs of four plows each, making twenty-four plows in all, and from the front timber A timbers D extend rearwardly and parallel with the timber B, and these timbers and the timbers B and C are united by as many transverse timbers E as may be found necessary or desirable.

In order to strengthen the timber C and prevent its sagging or springing on account of its great length I have shown a truss-frame F connected with the ends of the timbers and having the vertical struts or braces G in the usual or in any suitable manner for trusses. Each of the draft-timbers D projects slightly behind the diagonal timber C, and each one has secured to it a vertically-slotted yoke H. These yokes have plates extending forward and strongly bolted or otherwise secured to the timbers D, and they are also further stiffened by means of braces I, extending from the tops of the yokes to the beam C, while the ends of the timbers D are similarly connected with the beam by braces J, which hold these parts rigidly and prevent twisting or side strains, which might occur from the great strain of the gangs of plows which are being hauled by them. The plows are preferably mounted upon independent frames in gangs of four, the plow-frames being supported upon wheels and adjustable in the usual manner of such gang-plows. These plows have draw-bars K extending forward from them and connected with the draw-head L by a swivel-pin M, which passes through the draw head and bar, as shown, so that the bar may have a certain amount of side movement about the pin M. The front end of the draw-head L is forked, so that the forks extend on each side of the rear portion of the yoke H, and between the front ends of the fork is journaled an anti-friction roller N. This roller is adapted to travel freely up and down within the slotted yoke, traveling against the rear side of the yoke, and thus allowing the plows and the framework to move with relation to each other and accommodate themselves to variations in the surface of the ground without forcing the plows too deeply into the ground at one time or throwing them out of the ground at another. This construction is extremely important where so many gangs of plows are being hauled by the single frame-work and where it would be impossible to otherwise regulate all of the plows to make them do proper work.

At each end of the front timber A is fixed a stout axle, upon which the front bearing-wheels O are journaled.

P is a swivel-wheel having a vertical shaft Q, and this shaft is journaled between the timbers R and S, the latter being bolted to the timbers B and C about twelve inches above the former, so as to give a sufficient distance to make the journals rigid.

To the front timber A the eyebolts T are fixed. The bolts pass through the timber and are adjusted at the rear end by means of nuts and washers, as shown at U. From the eyebolts chains V extend forward and are all connected with a ring W, which ring is connected with the draw-bar of the traction-engine. (Not here shown.) The lengths of these chains are regulated by means of the nuts upon the eyebolts T, so that when all are regulated each chain will have its proper amount of draft upon the timber of the frame. The front portion of the frame extending as far back as the timber E in the present drawings is floored over and has sides which form an inclosing box, into which the straw to be used as a fuel upon the engine may be loaded and conveyed about the field. By this construction I am enabled to connect a large number of independent gangs of plows with a single draft apparatus in such a manner that each gang, while forming a part of the whole apparatus, is yet able to do its work and adjust itself independently of all the others.

Having thus described my invention, what I claim as new, and desire to secure by Letters Patent, is—

1. The main triangular frame having the bearing and swivel wheels, the parallel draft-timbers secured thereto in line with the travel of the machine, vertically-slotted yokes fixed to the rear end of each of the timbers, draw-heads having anti-frictional rollers journaled to them and adapted to travel in the vertical slots of the yokes, and draw-bars pivoted to these heads and connected with the gangs of plows, said draw-bars having a horizontal movement about the draw-heads, substantially as herein described.

2. A main triangular frame with its bearing and swivel wheels, parallel draft-timbers fixed thereto in the line of travel of the machine, and vertically-slotted yokes bolted to the rear ends of said timbers, braces I and J, extending from the yokes and timbers to the main frame, and draw-heads connected and movable vertically in the slotted yokes, and draw-bars connected with said draw-heads and with the gangs of plows and having a horizontal movement about the draw-heads, substantially as herein described.

3. The main triangular frame with bearing and swivel wheels, draft-timbers fixed in the main frame in the line of its travel and having attachments at the rear end, whereby a series of gangs of plows may be connected therewith and each gang made adjustable independent of the others, in combination with the single draft ring or eye W, the draft-chains radiating therefrom to the front beam of the main frame, and the eyebolts passing through said timber, and having nuts whereby they may be moved so as to regulate the draft of all the chains, substantially as herein described.

In witness whereof I have hereunto set my hand.

NAAMAN L. DARLING.

Witnesses:
T. B. MONTGOMERY,
J. F. CLYNE.